J. J. ELBERT.
APPARATUS AND PROCESS FOR THE PRODUCTION OF AMMONIA.
APPLICATION FILED NOV. 5, 1918.
1,313,884.
Patented Aug. 26, 1919.
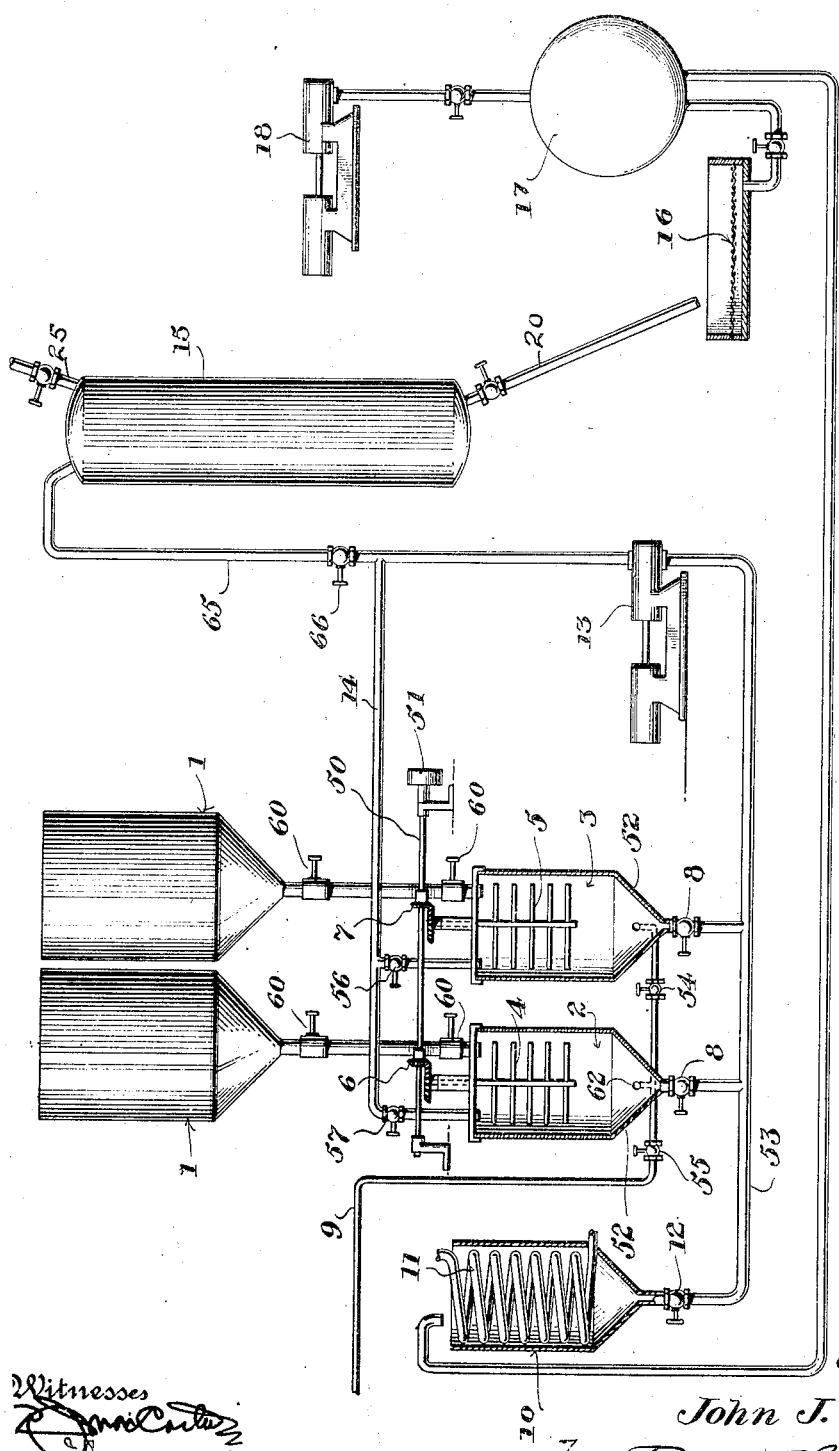
Witnesses
Inventor
John J. Elbert
by T. N. Witherspoon
Attorney

UNITED STATES PATENT OFFICE.

JOHN J. ELBERT, OF ELIZABETH, NEW JERSEY, ASSIGNOR TO AMERICAN CYANAMID COMPANY, OF NEW YORK, N. Y., A CORPORATION OF MAINE.

APPARATUS AND PROCESS FOR THE PRODUCTION OF AMMONIA.

1,313,884. Specification of Letters Patent. Patented Aug. 26, 1919.

Application filed November 5, 1918. Serial No. 261,212.

*To all whom it may concern:*

Be it known that I, JOHN J. ELBERT, a citizen of the United States, residing at Elizabeth, in the county of Union and State of New Jersey, have invented certain new and useful Improvements in Apparatus and Processes for the Production of Ammonia; and I do hereby declare the following to be a full, clear, and exact description of the invention, such as will enable others skilled in the art to which it appertains to make and use the same.

This invention relates to a process of and an apparatus for making ammonia from crude calcium cyanamid, or lime nitrogen, and has for its object to attain this result in a manner more expeditious and less costly than has heretofore been proposed.

With these and other objects in view the invention consists in the novel steps and combinations of steps constituting my process, all as will be more fully hereinafter disclosed and particularly pointed out in the claims.

Referring to the accompanying drawings forming a part of this specification, the figure is a diagrammatic partly sectional view of an apparatus suitable for carrying out this process.

In order that the precise invention may be more clearly understood it is said:—

In the production of ammonia from calcium cyanamid it has heretofore been proposed to make a slurry of lime nitrogen in a slurry tank provided with agitation, aerate the same if desirable, add alkali in the form of caustic soda, or soda ash, to further the reaction, and finally charge this slurry into the autoclave, or pressure apparatus, for further treatment. This simple procedure, however, does not take into account a number of very important reactions which come into play in the production of the ammonia from the crude cyanamid.

In the first place, it is common practice to return to a new procedure the filtered liquor from the product discharged from the autoclave in a previous operation. As the discharged product is usually boiling hot this liquor is of a temperature so high in most cases that upon the addition of fresh lime nitrogen for making up a new charge, the heat of hydration raises the temperature of the already hot liquor to such a point, that an ammonia generation is likely to start during the mixing. In view of the extremely rapid reaction when it is once started, it is a difficult matter to close up the autoclave, if the mixing has been carried on therein; and it entails a very large loss of ammonia in case the ammonia reaction should start in an outside mixing tank.

I have, therefore, found it advisable to collect the filtrate and if its temperature is above 50° C. I cool the same down to as much below that point as is found necessary in order that an ammonia production shall not automatically start with the addition of lime nitrogen in the slurry tank.

In order to obtain the maximum capacity out of an autoclave, which is an expensive piece of apparatus, it is very necessary that the mixing of lime nitrogen and liquor be accurately proportioned, so as to obtain a slurry of maximum density and at the same time of sufficient dilution that the slurry does not become too thick through loss of water during the ammonia generation.

A thick slurry is difficult to handle through pumps and pipe lines, because it tends to set solid in the line even if left to stand quiet for a short time. In handling these thick liquors, it is therefore necessary that some provision be made for washing out and draining all pipe lines and pumps which at any time become full of slurry.

I have, therefore, developed a new process, an apparatus for handling lime nitrogen in an autoclave, which will now be disclosed.

The particular form of apparatus for carrying out the process appearing in the drawings may be described as follows:—

1 represents tanks for storing a weighted quantity of lime nitrogen, 2 and 3 represent slurry mixing tanks which may be so located that the contents of the silos 1 can be discharged into them either directly by gravity, or through suitable means not shown. The tanks 2 and 3 are provided with agitators 4 and 5 driven through suitable transmission gears 6 and 7, carried by the shaft 50 having the driving pulley 51. Each tank is provided with a conical bottom 52 leading to a discharge pipe line 53, and is closed by a valve 8. Through the bottom or in any other suitable manner, compressed air may be introduced, as for instance, through the line 9 provided with the valves 54 and 55. It is often convenient to blow air through the slurries in tanks 2 and 3 in order to remove impurities that would otherwise appear in the ammonia. 10 is a tank provided with a cooling coil 11 which is used for measuring a definite quantity of liquor to be added to each mixing tank for making up the charge of slurry. The tank 10 discharges through a valve 12, to a pump 13 which in turn delivers the liquor from tank 10 through line 14 into either of the mixing tanks 2 and 3 by manipulation of suitable valves 56 and 57. 15 is an autoclave, 16 a filter, 17 a receiving tank for the filtrate, and 18 a vacuum pump.

In operation liquor from receiver 17 is either pumped, or otherwise delivered into measuring tank 10, in a suitable quantity for making up a charge. Here it is cooled to a proper temperature of say to 50° C., or lower, and additions of caustic soda or soda ash may be made if advisable. The proper amount of liquor from tank 10 is then run through the valve 12 into pump 13, and delivered through the pipe 14 into say mixing tank 2. Here lime nitrogen is added from tank 1, and a slurry made up of proper proportions as by manipulating the cut offs 60 with which said silos are provided.

If it is desired to aerate this slurry, compressed air is led in through the bottom of tank 2 as at 62 from the compressed air pipe line 9. When the slurry is properly prepared tank 2 is discharged through valve 8 to pump 13, and pumped into the autoclave 15 through pipe line 65. As the slurry would set in the pipe lines and pump if permitted to remain there, a valve such as 56 or 57 in line 14 is now opened over an empty mixing tank, and the slurry lying in the elevated pipe line 65 runs back into the mixing tank which is ready for preparing the next charge. In the meantime, the measuring tank 10 has been filled with fresh liquor from receiver 17 and this liquor is pumped through valve 12 and pump 13 into the autoclave 15 to clear lines 53 and 65. The valves 56 and 57 are preferably closed while fresh liquor is being pumped into autoclave 15. This said fresh liquor contains relatively a small amount of solids and it therefore has no tendency to set when left in the pipe lines. After having thus cleared pipe line 65, the valves 56 and 57 may be opened and the bulk of this said fresh liquor or solution may be next diverted through pipe line 14 by closing the valve 66 and thus clearing out said line 14. The lines 53, 65 and 14 having thus been cleared, the slurry tank 3 is ready to receive a new charge of lime nitrogen. It will now be clear that by using this system of operation, the pipe lines may be continuously flushed with clear filter liquor and therefore, there will be no chance for stoppage due to the setting of the slurry.

After the ammonia is liberated in autoclave 15 it is discharged through any suitable opening, while the liquor may pass out through the pipe 20. Steam is conveniently introduced through the pipe 25.

The preferred proportions of cyanamid and mixing liquor are approximately two parts of liquor to one part of solids. The measurements of the liquor are made in a crude way and therefore, these proportions need not be adhered to. In practice the operator can readily admit to tank 10 the right quantity of liquor by noticing its height on the inside of said tank, or he can use other and well known means of ascertaining the quantity of liquor in said tank if he so desires.

As regards the ascertainment of the quantity of solids required, known weights of solids are placed in the tanks 1, and fairly accurate amounts can be readily withdrawn either by manipulating the cutoff valves 60 or other well known means may be employed. The ammonia is conveniently drawn off from the autoclave 15 through the steam pipe 25 or by other means not shown.

While the above represents only one type of apparatus for carrying out the essential principles of this process, it is self-evident that other modifications may occur to those skilled in the art which do not depart in principle from the spirit of the invention, and therefore, I do not wish to be limited to the above disclosure other than may be required by the claims.

What I claim is:—

1. In an apparatus for producing ammonia from a cyanamid or other compound the combination of a holding means for said compound; a measuring tank for the liquor used in making a slurry of said compound; a mixing tank for said slurry; means to deliver said compound from said holding means to said mixing tank; means to deliver said liquor after it has been measured from said measuring tank, to said mixing tank; an autoclave and means for delivering the slurry from said mixing tank to said autoclave, substantially as described.

2. In an apparatus for making ammonia from a crude cyanamid or other compound, the combination of a holding bin for said compound; measuring tank; a mixing tank; an autoclave; a storage tank for the liquor recovered from said autoclave; connections between said storage tank and said measuring tank; connections from said measuring tank to said mixing tank; means to deliver said compound from said bin to said mixing tank; agitating means in said mixing tank to form a slurry from its contents; means to deliver said slurry from said mixing tank to said autoclave; and means to deliver the residual liquor from said autoclave into said storage tank, substantialy as described.

3. In an apparatus for making ammonia from a crude cyanamid or other compound, the combination of means for making a slurry of said compound and the residual hot liquor from a previous operation; an autoclave; pipe connections for delivering said slurry into said autoclave; means for blowing air through said slurry before it reaches said autoclave; and means for cooling said liquor before it becomes a part of said slurry, substantially as described.

4. In an apparatus for making ammonia from a crude cyanamid or other compound, the combination of means for making a slurry of said compound and the residual hot liquor from a previous operation comprising a measuring tank and a storage tank; an autoclave; pipe connections for delivering said slurry into said autoclave; a pump in said pipe connections; means for blowing air through said slurry before it reaches said autoclave; and means for cooling said liquor before it becomes a part of said slurry, substantially as described.

5. The process of making ammonia from a crude cyanamid or similar compound which consists in measuring the hot liquor from a previous operation; proportioning the quantity of said compound to the quantity of said liquor used; mixing said liquor and compound into slurry; passing said slurry through a pipe line into an autoclave; forcing fresh liquor through said pipe line to clear the same of slurry; and subjecting said slurry to the action of heat and pressure in said autoclave sufficient to produce ammonia, substantially as described.

6. The process of making ammonia from a crude cyanamid or similar compound which consists in measuring and cooling the hot liquor obtained from a previous operation; proportioning the quantity of said compound used to the quantity of said liquor; forming a slurry of the quantities of said compound and liquor thus obtained; and subjecting said slurry to the action of a temperature and pressure sufficient to form ammonia, substantially as described.

7. The process of making ammonia from a crude cyanamid or similar compound which consists in measuring and cooling the hot liquor obtained from a previous operation; proportioning the quantity of said compound used to the quantity of said liquor; forming a slurry of the quantities of said compound and liquor thus obtained; blowing air through said slurry before the ammonia reaction starts; and subjecting said slurry to the action of a temperature and pressure sufficient to form ammonia, substantially as described.

8. The process of making ammonia from a crude cyanamid or similar compound, which consists in measuring and cooling the hot liquor obtained from a previous operation; proportioning the quantity of said compound used to the quantity of said liquor; forming a slurry of the quantities of said compound and liquor thus obtained; forcing said slurry through a pipe line into an autoclave; passing fresh hot liquor through said pipe line to clear it of any slurry that might otherwise set therein; and subjecting said slurry to the action of a temperature and pressure sufficient to form ammonia, substantially as described.

In testimony whereof I affix my signature, in presence of two witnesses.

JOHN J. ELBERT.

Witnesses:
　ALICE E. STRAND,
　GEORGE E. COX.